United States Patent
Chiu

(10) Patent No.: US 9,876,341 B2
(45) Date of Patent: Jan. 23, 2018

(54) CABLE AND FLEXIBLE CONDUIT GLAND ASSEMBLY

(71) Applicant: AVC INDUSTRIAL CORP., New Taipei (TW)

(72) Inventor: Teh-Tsung Chiu, New Taipei (TW)

(73) Assignee: AVC INDUSTRIAL CORP., New Taipei (TW)

( * ) Notice: Subject to any disclaimer, the term of this patent is extended or adjusted under 35 U.S.C. 154(b) by 0 days.

(21) Appl. No.: 15/400,053

(22) Filed: Jan. 6, 2017

(65) Prior Publication Data
US 2017/0117696 A1 Apr. 27, 2017

Related U.S. Application Data

(62) Division of application No. 14/153,808, filed on Jan. 13, 2014, now Pat. No. 9,601,914.

(51) Int. Cl.
*H02G 15/007* (2006.01)
*H02G 3/06* (2006.01)
*H02G 15/013* (2006.01)
*H01B 7/04* (2006.01)

(52) U.S. Cl.
CPC ............ *H02G 15/007* (2013.01); *H01B 7/04* (2013.01); *H02G 3/0616* (2013.01); *H02G 15/013* (2013.01)

(58) Field of Classification Search
CPC .. H02G 15/007; H02G 3/0691; H02G 3/0675; H02G 15/013; F16J 15/022
See application file for complete search history.

(56) References Cited

U.S. PATENT DOCUMENTS

| | | | | |
|---|---|---|---|---|
| 1,065,515 A | * | 6/1913 | Ewert | F16L 37/256 277/613 |
| 2,470,538 A | * | 5/1949 | Wolfram | F16L 33/222 285/249 |
| 3,424,853 A | * | 1/1969 | Johnson | H02G 15/085 174/359 |
| 3,603,912 A | * | 9/1971 | Kelly | H02G 3/0616 174/665 |
| 4,015,329 A | * | 4/1977 | Hutchison | H02G 3/088 174/667 |
| 4,169,967 A | * | 10/1979 | Bachle | F16L 33/224 174/654 |

(Continued)

FOREIGN PATENT DOCUMENTS

GB 2276773 A * 10/1994 ............ H02G 15/04

*Primary Examiner* — Rodney Mintz
(74) *Attorney, Agent, or Firm* — Ming Chow; Sinorica, LLC

(57) ABSTRACT

A cable and flexible conduit gland assembly includes a mounting member mounted in a predetermined object, one or multiple connection members, an outer cap, and one packing device and one or multiple auxiliary clamping sleeves mounted in the mounting member between the connection members and the outer cap and compressible by the outer cap and the connection members to wrap about the periphery of an inserted cable and to provide multiple packing effects. Thus, the cable and flexible conduit gland assembly has high IP rating, and is practical for dynamic mechanical application, or application in a deep-water environment or high explosive atmosphere.

1 Claim, 10 Drawing Sheets

(56) References Cited

U.S. PATENT DOCUMENTS

| | | | | |
|---|---|---|---|---|
| 4,250,348 A * | 2/1981 | Kitagawa | F16L 5/06 | 174/652 |
| 4,334,121 A * | 6/1982 | Kutnyak | H02G 3/0468 | 138/109 |
| 4,583,811 A * | 4/1986 | McMills | H01R 9/05 | 174/89 |
| 4,608,454 A * | 8/1986 | Lackinger | H02G 3/065 | 174/651 |
| 4,625,998 A * | 12/1986 | Draudt | A47L 9/242 | 285/110 |
| 4,630,850 A * | 12/1986 | Saka | F16L 25/0036 | 285/322 |
| 4,692,563 A * | 9/1987 | Lackinger | H02G 3/0641 | 174/654 |
| 4,801,158 A * | 1/1989 | Gomi | F16L 25/0036 | 285/330 |
| 4,814,547 A * | 3/1989 | Riley | H02G 3/0675 | 174/653 |
| 4,900,068 A * | 2/1990 | Law | F16L 33/222 | 285/139.2 |
| 5,068,496 A * | 11/1991 | Favalora | F16L 5/06 | 174/654 |
| 5,072,072 A * | 12/1991 | Bawa | H02G 3/0691 | 174/655 |
| 5,310,963 A * | 5/1994 | Kennelly | H02G 15/04 | 174/650 |
| 5,321,205 A * | 6/1994 | Bawa | H02G 15/04 | 174/655 |
| 5,543,582 A * | 8/1996 | Stark | H02G 3/0675 | 174/653 |
| 5,763,833 A * | 6/1998 | Bawa | H02G 15/04 | 174/653 |
| 5,927,892 A * | 7/1999 | Teh-Tsung | H02G 3/0675 | 285/322 |
| 5,929,383 A * | 7/1999 | Marik | H01R 13/648 | 174/78 |
| 5,951,327 A * | 9/1999 | Marik | H01R 9/0527 | 439/607.44 |
| 6,034,325 A * | 3/2000 | Nattel | H01R 9/03 | 174/59 |
| 6,036,237 A * | 3/2000 | Sweeney | F16L 25/0036 | 285/322 |
| 6,042,396 A * | 3/2000 | Endo | H01R 9/0527 | 174/652 |
| 6,099,046 A * | 8/2000 | Oh | F16L 25/0036 | 285/353 |
| 6,162,995 A * | 12/2000 | Bachle | H02G 15/04 | 174/151 |
| 6,173,995 B1 * | 1/2001 | Mau | F16L 25/0036 | 285/334.5 |
| 6,254,145 B1 * | 7/2001 | Schwarz | F16L 25/0045 | 285/319 |
| 6,350,955 B1 * | 2/2002 | Daoud | H02G 3/065 | 174/651 |
| 6,435,567 B2 * | 8/2002 | Kikumori | F16L 25/0036 | 285/319 |
| 6,488,318 B1 * | 12/2002 | Shim | F16L 19/061 | 285/322 |
| 6,764,107 B1 * | 7/2004 | Obahi | F16L 25/0036 | 285/308 |
| 6,812,406 B2 * | 11/2004 | Hand | H02G 3/0666 | 16/2.1 |
| 6,877,781 B2 * | 4/2005 | Edler | F16L 25/0036 | 285/322 |
| 6,908,114 B2 * | 6/2005 | Moner | F16L 25/0036 | 285/23 |
| 6,974,162 B2 * | 12/2005 | Chelchowski | F16L 47/04 | 285/322 |
| 7,183,486 B2 * | 2/2007 | Pyron | H01R 13/5219 | 174/17.06 |
| 7,431,343 B2 * | 10/2008 | Chiu | F16L 25/0036 | 174/655 |
| 7,504,582 B1 * | 3/2009 | Chiu | H02G 3/0675 | 174/650 |
| 7,690,695 B2 * | 4/2010 | Duquette | F16L 25/0036 | 285/249 |
| 7,735,876 B2 * | 6/2010 | Chiu | F16L 5/00 | 174/655 |
| 7,900,970 B2 * | 3/2011 | Chiu | F16L 5/00 | 174/655 |
| 7,900,971 B2 * | 3/2011 | Chiu | F16L 5/00 | 174/655 |
| 8,288,667 B2 * | 10/2012 | Chiou | H02G 3/0658 | 174/652 |
| 8,367,944 B2 * | 2/2013 | Chiou | H02G 3/0691 | 174/480 |
| 8,485,062 B2 * | 7/2013 | Chiou | F16C 1/102 | 74/502.4 |
| 8,490,513 B2 * | 7/2013 | Chiou | F16C 1/102 | 174/480 |
| 8,701,520 B2 * | 4/2014 | Chiou | F16C 1/102 | 174/480 |
| 9,231,397 B2 * | 1/2016 | Chiu | F16J 15/022 | |
| 9,371,948 B2 * | 6/2016 | Coyle, Jr. | F16L 19/12 | |
| 9,601,914 B2 * | 3/2017 | Chiu | H02G 15/007 | |
| 2002/0079702 A1 * | 6/2002 | Baumann | F16L 25/0036 | 285/343 |
| 2005/0001388 A1 * | 1/2005 | Travers | F16L 21/03 | 277/644 |
| 2005/0035594 A1 * | 2/2005 | Kiely | H02G 3/0675 | 285/154.1 |
| 2005/0077722 A1 * | 4/2005 | Kiely | F16L 19/061 | 285/1 |
| 2006/0219437 A1 * | 10/2006 | Chiu | H02G 3/088 | 174/653 |
| 2008/0217917 A1 * | 9/2008 | Chiu | H02G 3/0691 | 285/354 |
| 2008/0236861 A1 * | 10/2008 | Bartholoma | H01R 13/5205 | 174/78 |
| 2009/0174154 A1 * | 7/2009 | Chiu | F16L 5/00 | 277/603 |
| 2011/0226083 A1 * | 9/2011 | Chiou | F16C 1/102 | 74/502.4 |
| 2011/0226084 A1 * | 9/2011 | Chiou | F16C 1/102 | 74/502.4 |
| 2012/0024590 A1 * | 2/2012 | Chiou | H02G 3/0691 | 174/520 |
| 2012/0037416 A1 * | 2/2012 | Chiou | H02G 3/0658 | 174/652 |
| 2014/0015245 A1 * | 1/2014 | Chiu | H02G 3/06 | 285/133.11 |
| 2014/0202761 A1 * | 7/2014 | Pelletier | H02G 3/0658 | 174/653 |
| 2015/0048614 A1 * | 2/2015 | Coyle, Jr. | F16L 19/12 | 285/322 |
| 2015/0200530 A1 * | 7/2015 | Chiu | H02G 15/007 | 174/653 |
| 2015/0200531 A1 * | 7/2015 | Chiu | F16J 15/022 | 277/607 |

* cited by examiner

US 9,876,341 B2

CABLE AND FLEXIBLE CONDUIT GLAND ASSEMBLY

BACKGROUND OF THE INVENTION

1. Field of the Invention

The present invention relates to cable glands and more particularly, to a cable and flexible conduit gland assembly, which provides enhanced protection and multiple packing, airtight, waterproof, dustproof and anti-tensile effects.

2. Description of the Related Art

After installation of a cable in an electric box or any junction box of a machine, telecom or network system by means of a cable gland, the cable may be disconnected or loosened from the gland when stretched accidentally by an external force, causing leakage.

To avoid this problem, many improved cable gland designs are created, such as U.S. Pat. No. 5,927,892 entitled "Device for fastening a cable to a board", U.S. Pat. No. 8,490,513 entitled "Cable gland and gasket ring assembly", U.S. Pat. No. 8,288,667 entitled "Double-packing cable and flexible conduit gland". These prior art designs commonly comprise a mounting member, a clamping member, a packing ring and an outer cap. The mounting member is connected to a board member and screw-connected with the outer cap. The clamping member is sleeved onto the packing ring in the outer cap and compressed by the outer cap to wrap the packing ring about the periphery of the inserted cable, thereby locking the cable and protecting it against moisture and water.

However, the aforesaid prior art designs simply has one packing ring set between the mounting member and the outer cap to wrap about the inserted cable, i.e., these prior art designs simply provide one single packing effect that is insufficient to firmly hold down the cable. When the cable is stretched accidentally by an external force, a water leakage can occur.

According to the cable gland with water seal rings of U.S. Pat. No. 8,490,513 and the double-packing cable and flexible conduit gland of U.S. Pat. No. 8,288,667, the packing member comprises a packing segment compressible to clamp on the inserted flexible conduit, and a second packing segment compressible to clamp on the inserted cable, achieving double-layer packing effects. However, because the packing segment and the second packing segment are formed in one single packing member, the packing segment and the second packing segment can be destructed to lose its packing functioning when the flexible conduit or cable is stretched by an external force. Actually, these designs simply provide one layer of packing effect.

Further, when a cable gland is selected for dynamic mechanical application, outdoor application, or application in a deep-water environment or high explosive atmosphere, it must have a very high IP (International Protection) rating. However, the IP ratings of the aforesaid prior art designs are insufficient for dynamic mechanical application, or application in a deep-water environment or high explosive atmosphere.

According existing techniques, only one cable gland or cable and flexible conduit gland assembly can be installed one cable hole of a junction box. However, conventional cable glands, or cable and flexible conduit gland assemblies can simply provide one single layer of airtight, watertight and anti-tensile protection.

Therefore, it is desirable to provide a cable and flexible conduit gland assembly, which eliminates the aforesaid problems.

SUMMARY OF THE INVENTION

The present invention has been accomplished under the circumstances in view. It is therefore the main object of the present invention to provide a cable and flexible conduit gland assembly for securing a cable and a flexible conduit to an electric box, machine, telecom box or network communication box, which has a packing device, an auxiliary clamping sleeve mounted in a mounting member and a connection member and set between the mounting member and an outer cap to provide enhanced protection and multiple packing, airtight, waterproof, dustproof and anti-tensile effects.

It is another object of the present invention to provide a cable and flexible conduit gland assembly for securing a cable, or, a cable and a flexible conduit, which has a very high IP rating, practical for dynamic mechanical and outdoor applications, as well as applications in a deep-water environments and high explosive atmospheres.

To achieve these and other objects of the present invention, a cable and flexible conduit gland assembly of the invention comprises a mounting member, at least one connection member, an outer cap, a packing device, and an auxiliary clamping sleeve. The mounting member is a tubular member, comprising a first outer thread. Each connection member comprises a second outer thread, a first axial hole, a first tapered surface defined therein the first axial hole, and a first inner thread defined in the first axial hole and threaded onto the first outer thread of the mounting member. The outer cap comprises an axial through hole extending through two opposite ends thereof, a second tapered surface defined in the axial through hole, and a second inner thread defined in the axial through hole at one side relative to the second tapered surface and threaded onto the second outer thread of one connection member. The packing device comprises a packing sleeve mounted in the mounting member and the first axial hole of one connection member and defining therein an axially extended through hole, and a clamping member sleeved onto the packing sleeve. The auxiliary clamping sleeve is mounted in the axial through hole of the outer cap and the second axial hole of one connection member, comprising a through hole axially extended through two opposite ends thereof and an annular hooked portion defined in the axially extended through hole of the auxiliary clamping sleeve.

During application of the cable and flexible conduit gland assembly to lock a flexible conduit and a cable to a junction box or the like, the annular hooked portion of the auxiliary clamping sleeve is engaged into the spirally extended external groove around the outer perimeter of the flexible conduit.

In one embodiment of the present invention, two connection members are used, and the cable and flexible conduit gland assembly further comprises a second packing device mounted in the first axial hole of one connection member and the second axial hole of the other connection member. The second packing device comprises a second packing sleeve, and a second clamping member sleeved onto the second packing sleeve. The second packing sleeve defines therein an axially extended through hole. Further, the second packing device and the packing device are identical and exchangeable.

In another embodiment of the present invention, a plurality of connection members and a plurality of second packing devices are used in the cable and flexible conduit assembly, wherein each second packing device is mounted in the first axial hole of one connection member and the second axial hole of another connection member.

Thus, when a flexible conduit is mounted in the cable and flexible conduit gland assembly after insertion of a cable through the flexible conduit, the packing device that is set between the mounting member and the connection member is compressed to wrap about the periphery of the cable and to provide a first layer of airtight, waterproof, dustproof and anti-tensile protection, and the auxiliary clamping sleeve that is set between the connection member and the outer cap is compressed to wrap about the periphery of the flexible conduit and to provide a second layer of airtight, waterproof, dustproof and anti-tensile protection. Thus, the cable and flexible conduit gland assembly of the invention has a high IP rating, and is practical for dynamic mechanical and outdoor applications, as well as applications in a deep-water environments and high explosive atmospheres.

In still another alternate form of the present invention, the cable and flexible conduit gland assembly comprises a mounting member, at least one connection member, an outer cap, a packing device, and an auxiliary clamping sleeve. The mounting member is a tubular member, comprising a first outer thread. Each connection member comprises a second outer thread, a first axial hole, a first tapered surface defined in the first axial hole, and a first inner thread defined in the first axial hole and threaded onto the first outer thread of the mounting member. The outer cap comprises an axial through hole extending through two opposite ends thereof, a second tapered surface defined in the axial through hole, and a second inner thread defined in the axial through hole at one side relative to the second tapered surface and threaded onto the second outer thread of one connection member. The packing device comprises a packing sleeve mounted in the mounting member and the first axial hole of one connection member and defining therein an axially extended through hole, and a clamping member sleeved onto the packing sleeve. The auxiliary clamping sleeve is mounted in the axial through hole of the outer cap and one connection member, comprising a through hole axially extended through two opposite ends thereof, an outer race spaced around the periphery thereof, an annular mounting groove defined within the outer race, and an annular hooked portion defined in the annular mounting groove.

The cable and flexible conduit gland assembly of the invention has the benefits as follows:

When compared with conventional cable gland designs, the invention has the added connection member to provide enhanced protection and enhanced tensile strength. By means of increasing the number of the connection member, the protection and tensile strength levels are relatively enhanced.

By means of increasing the number of the connection member, the airtight strength of the cable and flexible conduit gland assembly is enhanced to meet different industrial requirements for application under a high explosive atmosphere.

By means of increasing the number of the connection member, the watertight strength of the cable and flexible conduit gland assembly is enhanced to meet different industrial requirements for application in a deep-water environment.

By means of increasing the number of the connection member, the airtight strength of the cable and flexible conduit gland assembly is enhanced to meet different industrial requirements, preventing disconnection of the installed cable upon an impact.

DETAILED DESCRIPTION OF THE PREFERRED EMBODIMENT

Figure 1:
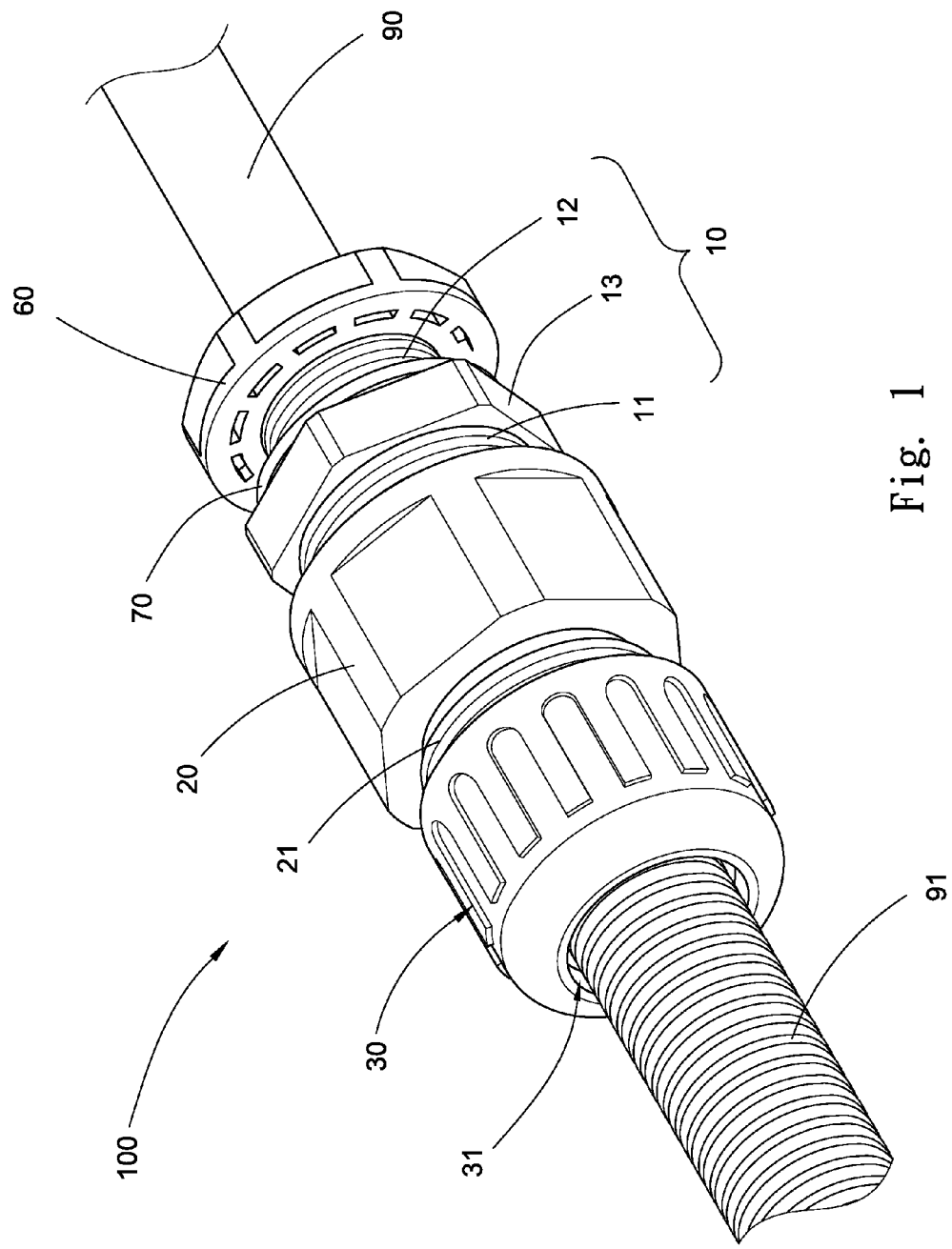
FIG. 1 is an elevational assembly view of a cable and flexible conduit gland assembly in accordance with the present invention.

Referring to FIGS. 1-4, a cable and flexible conduit gland assembly 100 for locking a flexible conduit 91 and a cable 90 to an electric box, machine, telecom box or network communication box in accordance with the present invention is shown. The cable and flexible conduit gland assembly 100 comprises:

a mounting member 10 that is a tubular member mounted in a board member 80 of an electric box, machine, telecom box or network communication box (see FIG. 7), comprising a first outer thread 11;

a connection member 20 that comprises a second outer thread 21, a first axial hole 22, a first tapered surface 23 defined therein the first axial hole 22, and a first inner thread 24 defined in the first axial hole 22 and threaded onto the first outer thread 11 of the mounting member 10;

an outer cap 30 that comprises an axial through hole 31 extending through two opposite ends thereof, a second tapered surface 32 defined in the axial through hole 31, and a second inner thread 33 defined in the axial through hole 31 at one side relative to the second tapered surface 32 and threaded onto the second outer thread 21 of the connection member 20;

a packing device 40 that comprises a packing sleeve 41 mounted in the mounting member 10 and the first axial hole 22 of the connection member 20 and defining therein an axially extended through hole 411, and a clamping member 42 sleeved onto the packing sleeve 41; and an auxiliary clamping sleeve 50 mounted in the axial through hole 31 of the outer cap 30 and the second axial hole 25 of the connection member 20, comprising a through hole 51 axially extended through two opposite ends thereof and an annular hooked portion defined in the axially extended through hole 51 for engaging a spirally extended external groove 910 around the periphery of the flexible conduit 91.

After insertion of the cable 90 through the flexible conduit 91 and insertion of the flexible conduit 91 through the cable and flexible conduit gland assembly 100 during application, the connection member 20 and the packing device 40 are set between the mounting member 10 and the outer cap 30 to hold down the flexible conduit 91 and to provide a first layer of airtight, waterproof, dustproof and anti-tensile protection, and the auxiliary clamping sleeve 50 is forced by the outer cap 30 against the periphery of the flexible conduit 91 to provide a second layer of airtight, waterproof, dustproof and anti-tensile protection. Thus, the cable and flexible conduit gland assembly of the present invention effectively provides enhanced protection and multiple packing, airtight, waterproof, dustproof and anti-tensile effects.

Figure 2A:
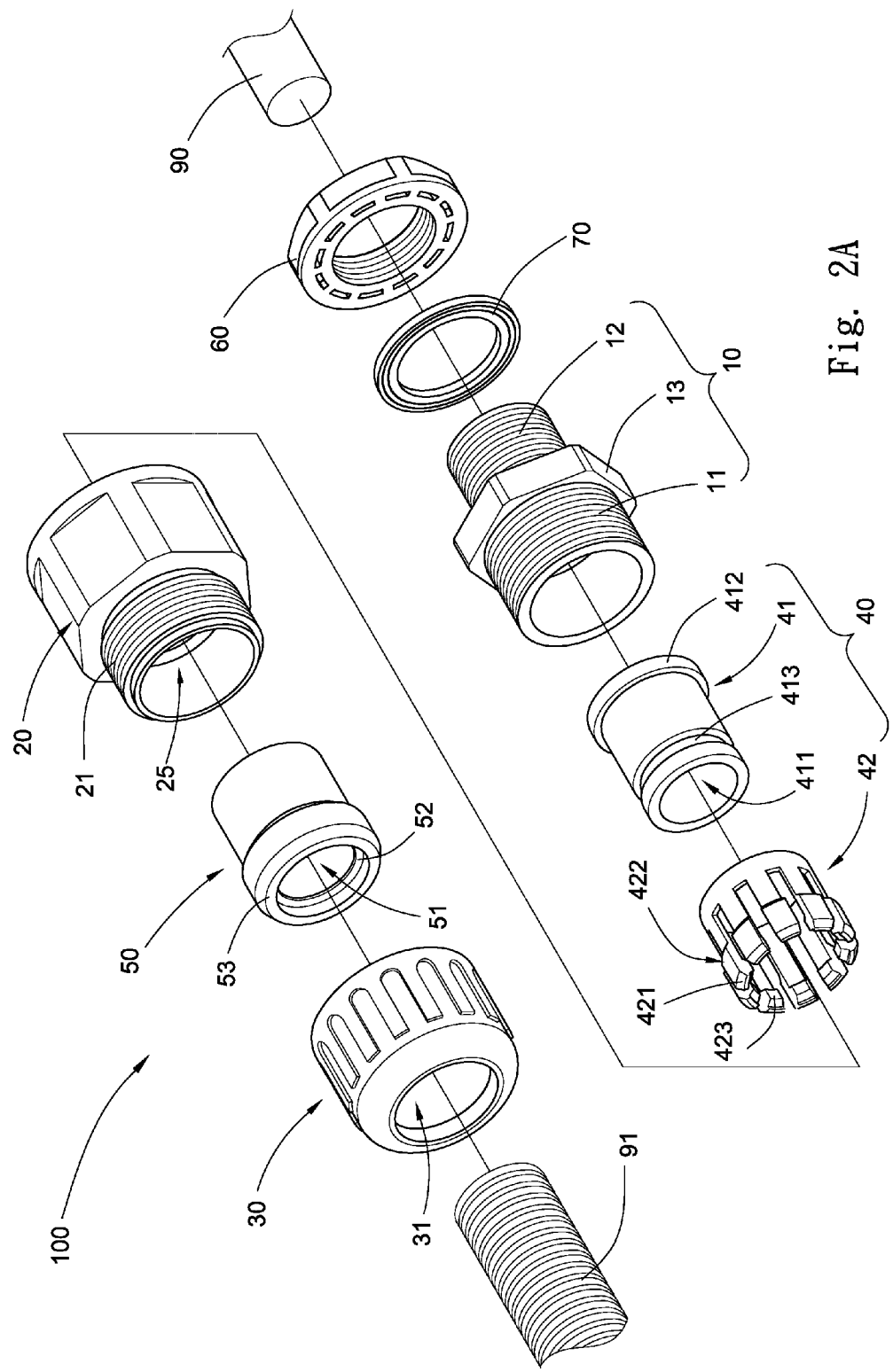
FIG. 2A is an exploded view of the cable and flexible conduit gland assembly in accordance with the present invention.
Figure 2B:
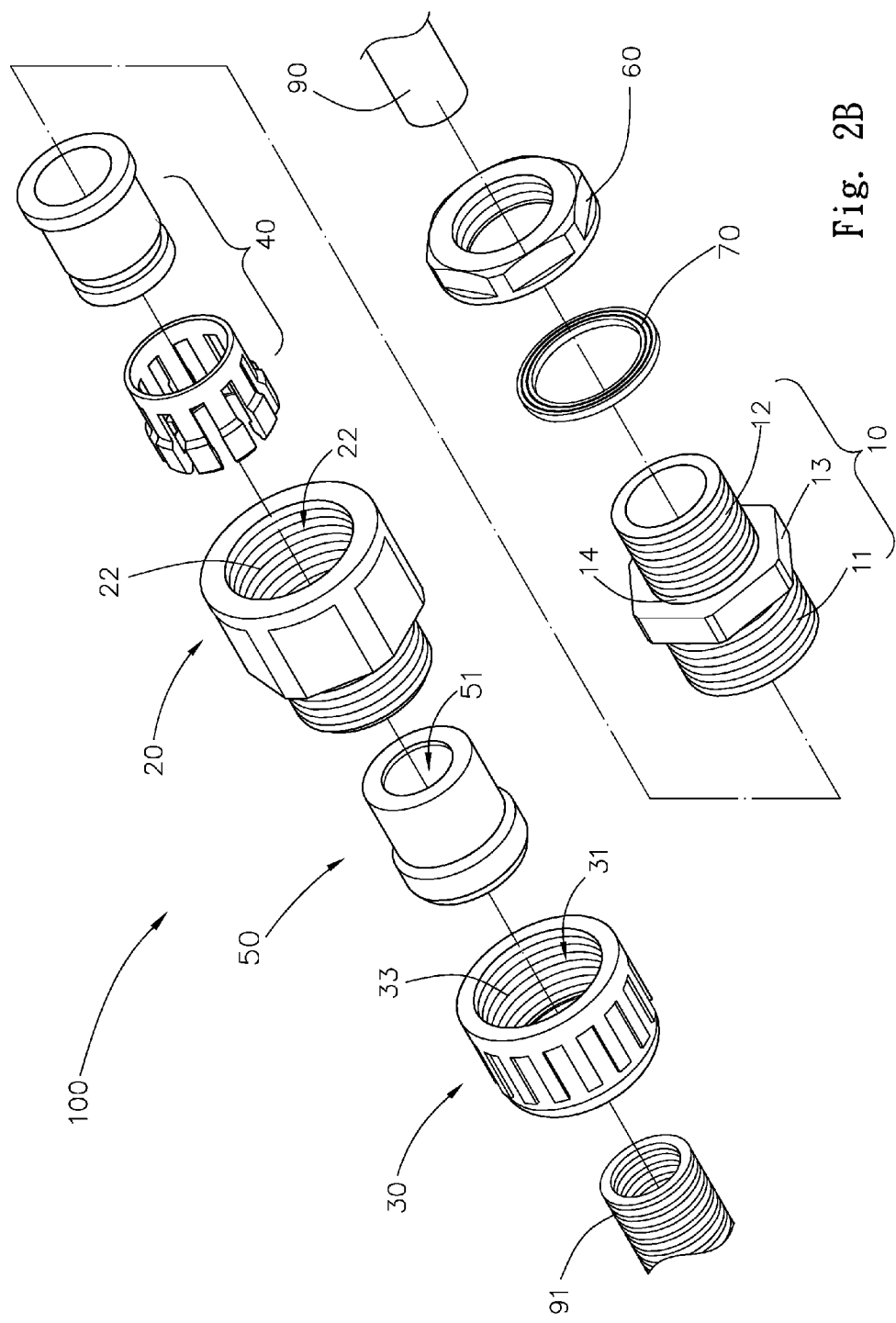
FIG. 2B corresponds to FIG. 2A when viewed from another angle.
Figure 3:
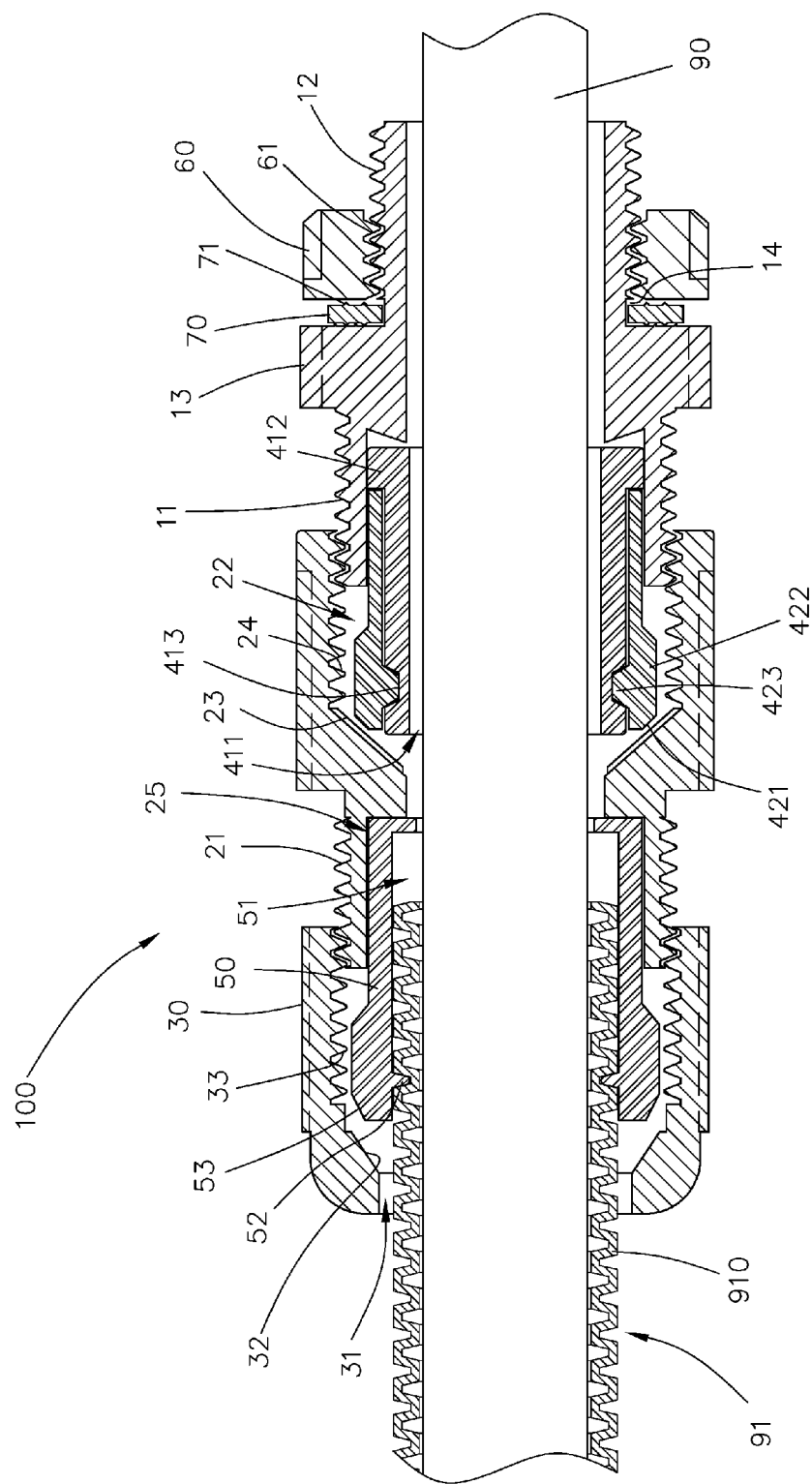
FIG. 3 is a longitudinal sectional view of the cable and flexible conduit gland assembly in accordance with the present invention.

Referring to FIGS. 2A, 2B and 3, the mounting member 10 further comprises a third outer thread 12, and a stop flange 13 extending around the periphery thereof between the first outer thread 11 and the third outer thread 12. The cable and flexible conduit gland assembly 100 further comprises a locking member 60 made in the form of a locknut and threaded onto the third outer thread 12 of the mounting member 10. After insertion of the mounting member 10 through a mounting hole (not shown) in the board member 80, the stop flange 13 is stopped at one side of the board member 80, and the locking member 60 is threaded onto the third outer thread 12 of the mounting member 10 and stopped at an opposite side of the board member 80.

After installation, the stop flange 13 and the locking member 60 are respectively stopped at two opposite sides of the board member 80, locking the mounting member 10 to the board member 80 against axial displacement.

Preferably, the mounting member 10 further comprises a locating groove 14 extending around the periphery thereof between the stop flange 13 and the third outer thread 12. Further, a gasket ring 70 is mounted in the locating groove 14 and sealed between the stop flange 13 of the mounting member 10 and the board member 80.

The gasket ring 70 is an elastic member made of, for example, rubber, and squeezed in between the stop flange 13 of the mounting member 10 and the board member 80 to prevent water leakage.

Further, because the gasket ring 70 is mounted in the locating groove 14 at one side of the stop flange 13 of the mounting member 10, it will not fall out of the mounting member 10 during delivery.

Referring to FIGS. 2 and 3 again, the packing device 40 and the auxiliary clamping sleeve 50 can be made of an elastic material, such as rubber, plastics or silicon rubber.

Referring to FIGS. 2A, 2B and 3 again, the packing sleeve 41 further comprises an end flange 412 extending around one end of the outer perimeter thereof. After sleeved the clamping member 42 onto the packing sleeve 41, one end of the clamping member 42 is stopped at the end flange 412. Thus, the clamping member 42 can be positively compressed to radially force the packing sleeve 41 against the periphery of the flexible conduit 91.

Thus, after the clamping member 42 is sleeved onto the packing sleeve 41, the end flange 412 effectively stops the clamping member 42 in place.

Further, the packing sleeve 41 comprises a neck portion 413 made in the form of an annular recess around the periphery. The clamping member 42 comprises a plurality of equiangularly spaced pawls 422 respectively terminating in a respective clamping block 423 that is engaged into the neck portion 413.

When the clamping member 42 is radially compressed to force the pawls 422 against the packing sleeve 41, the inside wall of the packing sleeve 41 around the through hole 411 is wrapped about the periphery of the flexible conduit 91 tightly, preventing displacement between the packing sleeve 41 and the flexible conduit 91.

Preferably, the clamping member 42 of the packing device 40 further comprises a beveled edge 421 located on an outer end of each clamping block 423 for stopping against the first tapered surface 23 of the connection member 20.

Thus, the first tapered surface 23 of the connection member 20 is stopped against the beveled edge 421 of the clamping member 42, causing the packing sleeve 41 and the clamping member 42 to be radially inwardly compressed to wrap about the periphery of the flexible conduit 91.

Referring to FIGS. 2 and 3 again, the auxiliary clamping sleeve 50 further comprises a tapered end edge 53 for stopping against the second tapered surface 32 of the outer cap 30.

After introduction of the structural detail and composition of the component parts of the cable and flexible conduit gland assembly, the features and advantages of the cable and flexible conduit gland assembly will now be outlined hereinafter.

Referring to FIG. 3 again, when connecting the cable and flexible conduit gland assembly to the flexible conduit 91 after insertion of the cable 90 through the flexible conduit 91, insert the flexible conduit 91 properly through the through hole 31 of the outer cap 30, the second through hole 51 of the auxiliary clamping sleeve 50, the through hole 411 of the packing sleeve 41 and the mounting member 10, and then fasten tight the outer cap 30 (rotate the outer cap 30 in direction toward the connection member 20) to force the second tapered surface 32 of the outer cap 30 against the tapered end edge 53 of the auxiliary clamping sleeve 50, thereby radially inwardly compressing the auxiliary clamping sleeve 50 to wrap about the periphery of the spirally extended external groove 91 of the flexible conduit 91 to achieve a first packing effect at a first packing area.

Thereafter, fasten tight the connection member 20 (rotate the connection member 20 in direction toward the mounting member 10) to force the first tapered surface 23 of the connection member 20 against the beveled edge 421 of the clamping member 42 of the packing device 40, thereby radially inwardly compressing the packing sleeve 41 to wrap the packing sleeve 41 about the periphery of the cable 90, thereby achieving a second packing effect at a second packing area Thus, the cable 90 and the flexible conduit 91 are compressed by the packing sleeve 41 and the auxiliary clamping sleeve 50 and prohibited from displacement relative to the cable and flexible conduit gland assembly, and thus, the invention provides enhanced protection and multiple packing, airtight, waterproof, dustproof and anti-tensile effects.

Further, in addition to the protection of the mounting member 10 and the outer cap 30, the cable 90 and the flexible conduit 91 are also well protected by the connection member 20, i.e., the invention provides long distance and large area protection to the cable 90 and the flexible conduit 91.

In general, the use of the connection member and packing devices in the cable and flexible conduit gland assembly provides enhanced protection and multiple packing, airtight, waterproof, dustproof and anti-tensile effects. Similar to the principle of tug of water that more people involve in a tug-of-war, a relatively greater force will be produced. The invention uses multiple packing devices to enhance the packing, airtight, waterproof, dustproof and anti-tensile effects. Thus, the invention is practical for dynamic mechanical application, outdoor application, as well as applications in deep-water environments or high explosive atmospheres.

It is worth mentioning that the invention provides an externally forced design to obtain a high IP rating and to eliminate the drawback of the internally forced prior art designs, making the cable and flexible conduit gland assembly practical for use under severe weather condition or in a deep-water environment.

Further, the user can add one or multiple extra connection members 20 to the cable and flexible conduit gland assembly to meet different industrial application requirements. By means of the second outer thread 21 and first inner thread 24 of each connection member 20, multiple connection members 20 can be screw-connected between the mounting member 10 and the outer cap 30 to provide enhanced protection and multiple packing, airtight, waterproof, dustproof and anti-tensile effects.

The aforesaid cable 90 is protected by the flexible conduit 91 and the cable and flexible conduit gland assembly, practical for outdoor application. After installation, the invention provides waterproof, dustproof, anti-impact, vermin-proof and anti-UV effects.

The aforesaid flexible conduit 91 should be interpreted broadly and should not be confined to one structure or material. Further, the flexible conduit 91 can be a coiled tube, or any of a variety of other flexible tubes made of metal, plastics or rubber.

Figure 4:
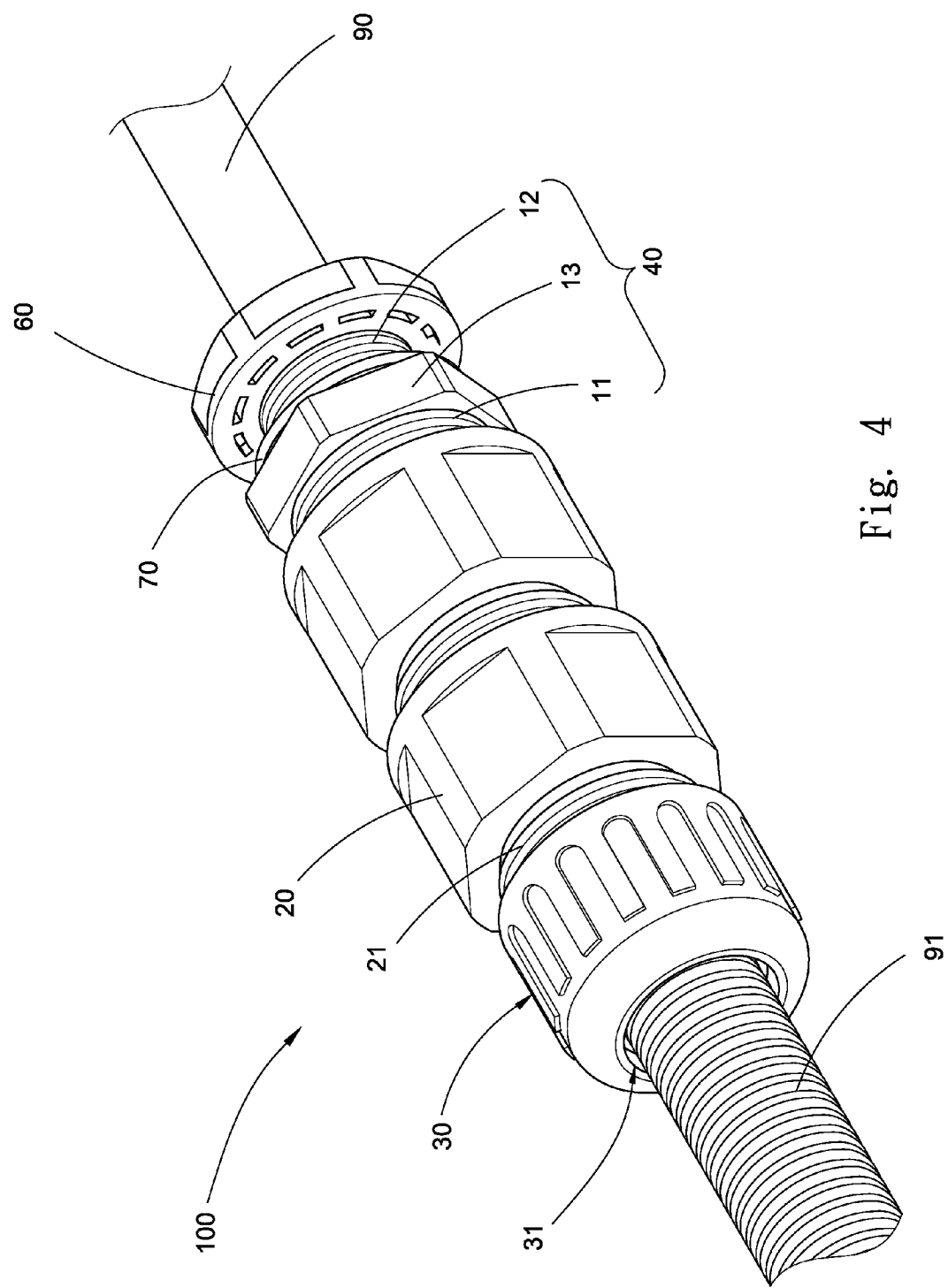
FIG. 4 is an elevational assembly view of an alternate form of the cable and flexible conduit gland assembly in accordance with the present invention.
Figure 5:
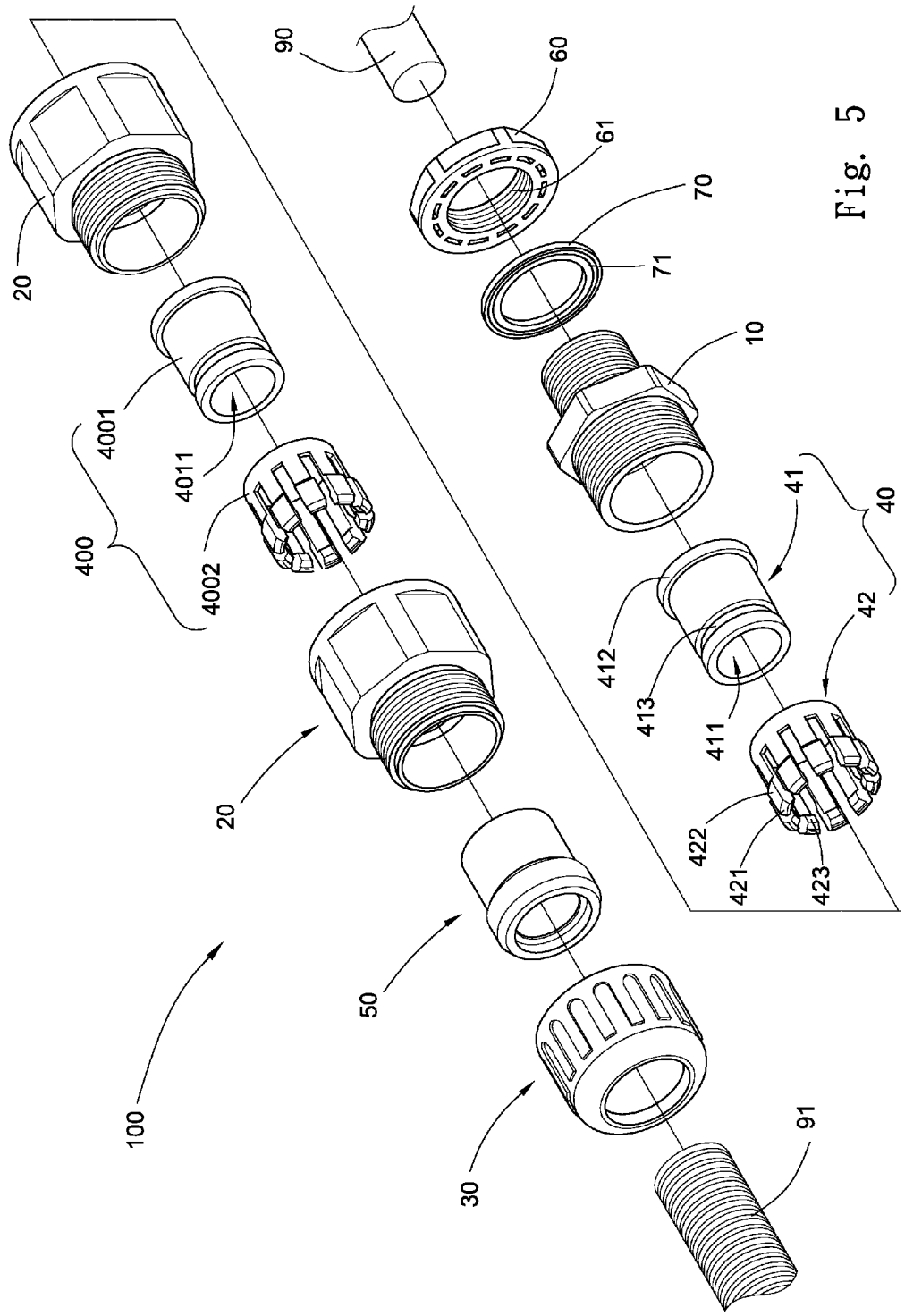
FIG. 5 is an exploded view of the cable and flexible conduit gland assembly shown in FIG. 4.
Figure 6:
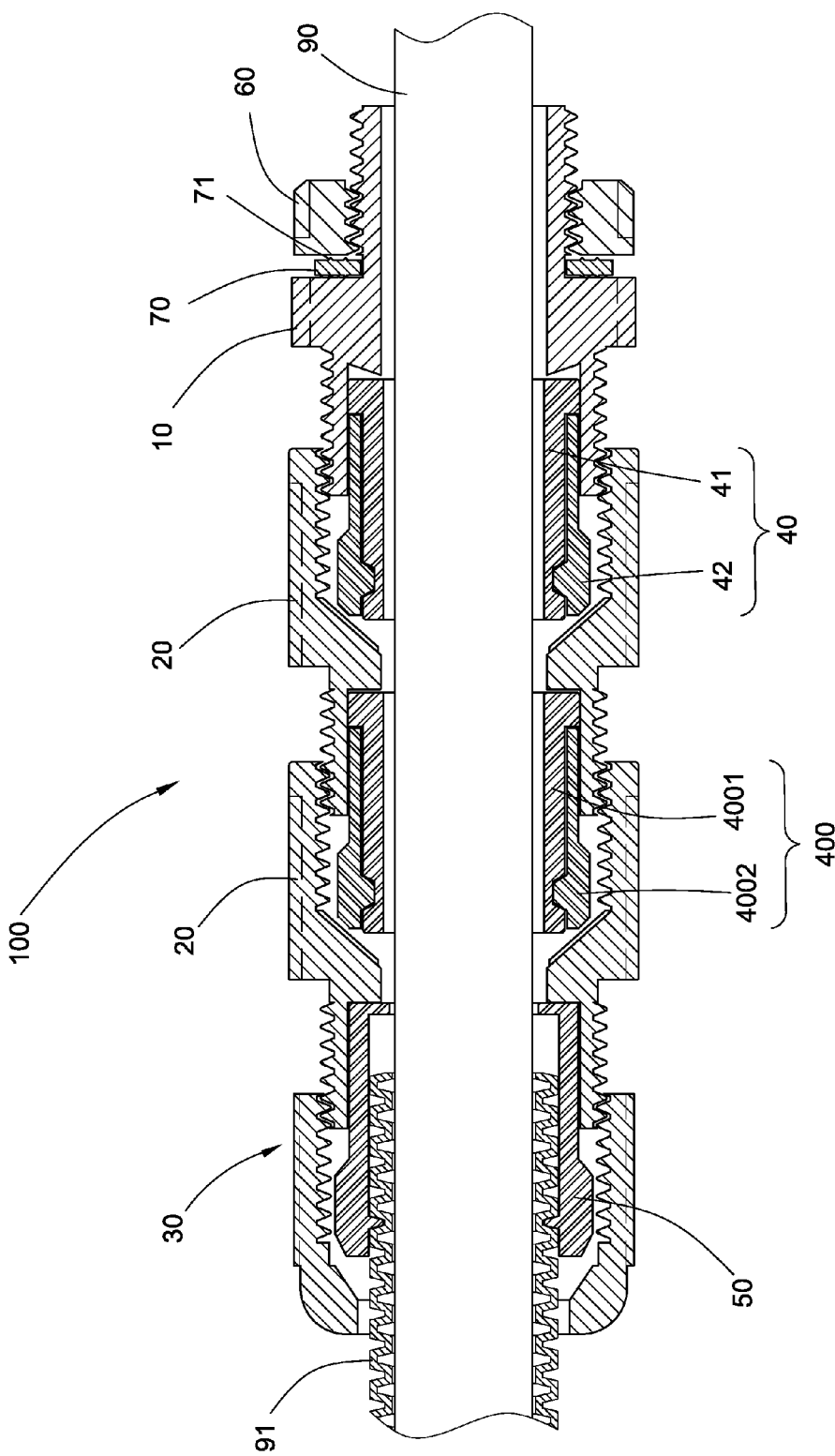
FIG. 6 is a longitudinal sectional view of the cable and flexible conduit gland assembly shown in FIG. 4.

In one alternate form of the present invention, as shown in FIGS. 4-6, the cable and flexible conduit gland assembly 100 comprises a mounting member 10, two connection members 20, an outer cap 30, a (first) packing device 40, a second packing device 400, auxiliary clamping sleeve 50, a locking member 60, and a gasket ring 70. In this embodiment, the two connection members 20 are connected in series; the second packing device 400 is mounted in the first axial hole 22 of one connection member 20 and the second axial hole 25 of the other connection member 20, comprising a second packing sleeve 4001 that defines therein an axially extended through hole 4011, and a second clamping member 4002 sleeved onto the second packing sleeve 4001. Further, the second packing device 400 and the (first) packing device 40 are identical and exchangeable.

In another alternate form of the present invention, a plurality of connection members 20 and two than two second packing devices 400 are used. In this embodiment, one second packing device 400 is mounted in the first axial hole 22 of one connection member 20, and the second axial hole 25 of the other connection member 20.

Thus, by means of increasing the number of the connection member 20 to hold down the cable 90 and the flexible conduit 91, the invention multiplies the packing, airtight, waterproof, dustproof and anti-tensile effects, allowing the cable and flexible conduit gland assembly to be used in severe weather environments, deep-water environments or high explosive atmospheres.

Further, the gasket ring 70 comprises an annular water-sealing flange 71 at each of two opposite sides thereof for stopping against the stop flange 13 of the mounting member 10 and the locking member 60 to seal out moisture and dust particles.

Figure 7:
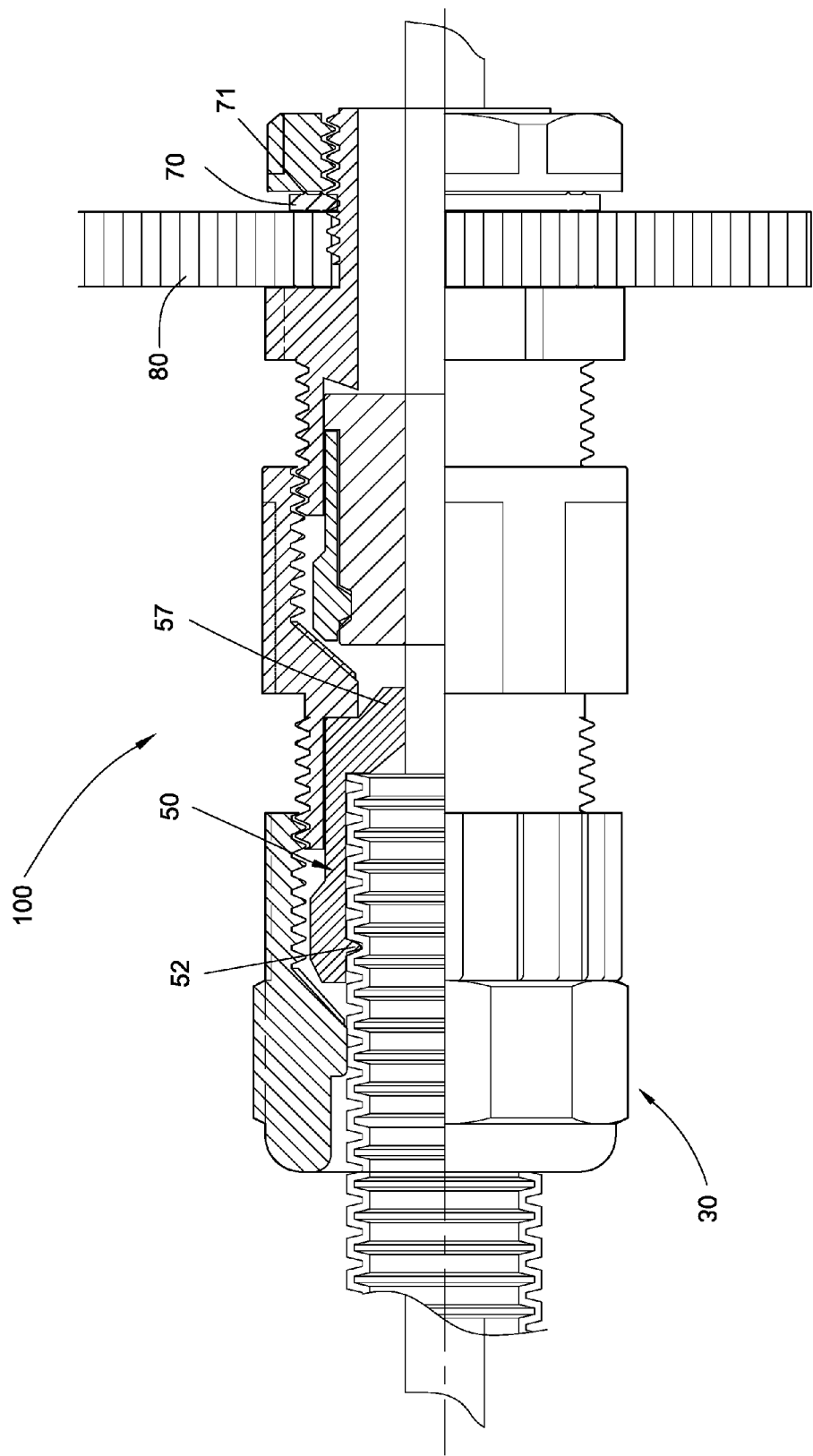
FIG. 7 is a schematic sectional view of still another alternate form of the present invention, illustrating the configuration of the clamping skirt of the auxiliary clamping sleeve.

Referring to FIG. 7, in order to prevent displacement of the cable 90 relative to the flexible conduit 91 due to that the outer diameter of the cable 90 is smaller than the inner diameter of the flexible conduit 91, the auxiliary clamping sleeve 50 further comprises a clamping skirt 57 extended from one end thereof remote from the annular hooked portion 52. The diameter defined in the clamping skirt 57 is smaller than the inner diameter of the auxiliary clamping sleeve 50. When the auxiliary clamping sleeve 50 is radially inwardly compressed to wrap about the outer perimeter of the flexible conduit 91 upon threading of the outer cap 30 onto the second outer thread 21, the clamping skirt 57 is also radially inwardly compressed to wrap about the periphery of the cable 90, achieving extra airtight, waterproof and anti-tensile effects.

Figure 8:
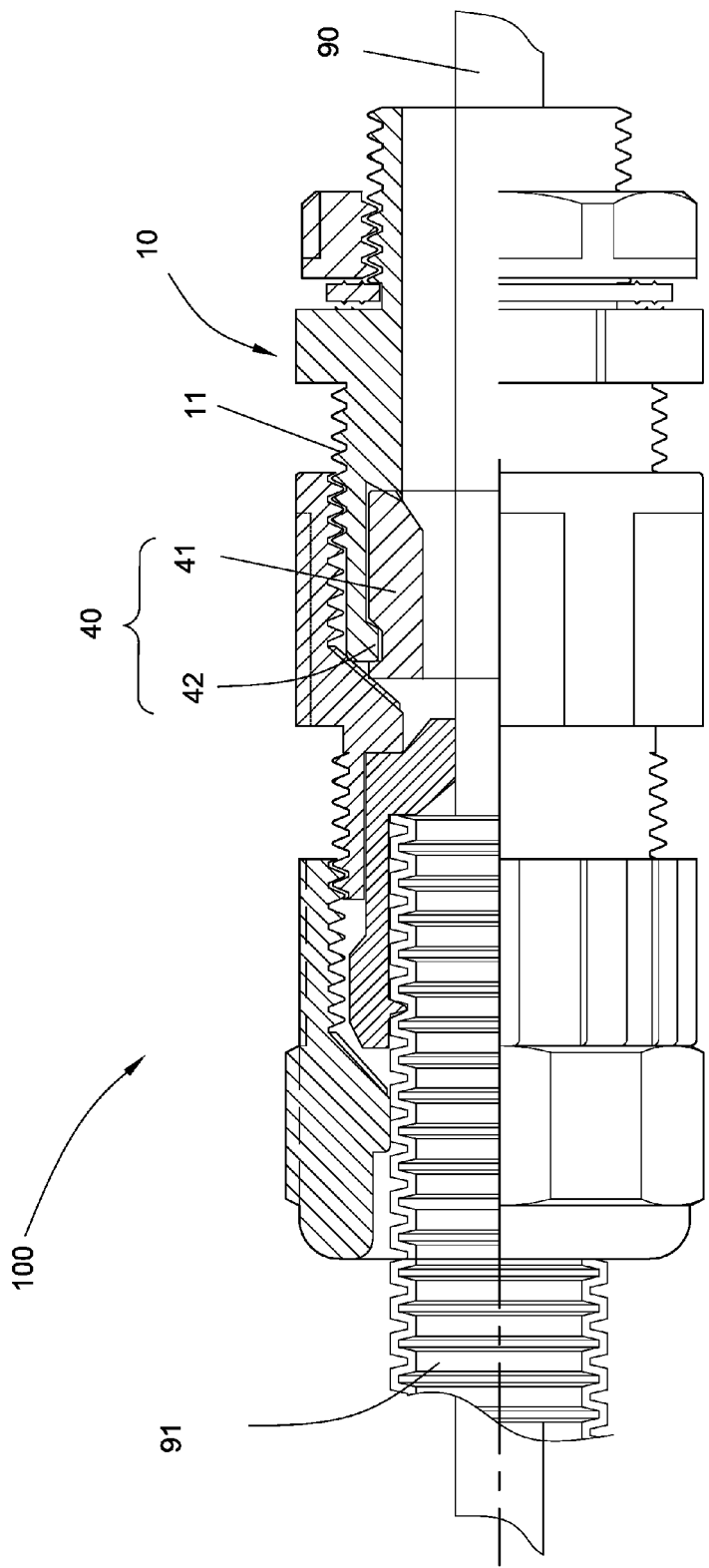
FIG. 8 is a schematic sectional view of still another alternate form of the present invention, illustrating the clamping member formed integral with the mounting member at an inner side of the first outer thread.

In still another alternate form, as shown in FIG. 8, the clamping member 42 is formed at an inner side of the first outer thread 11 of the mounting member 10, i.e., the first outer thread 11 and the clamping member 42 are made in integrity. Thus, this embodiment reduces the number of component parts and saves the installation cost.

Figure 9:
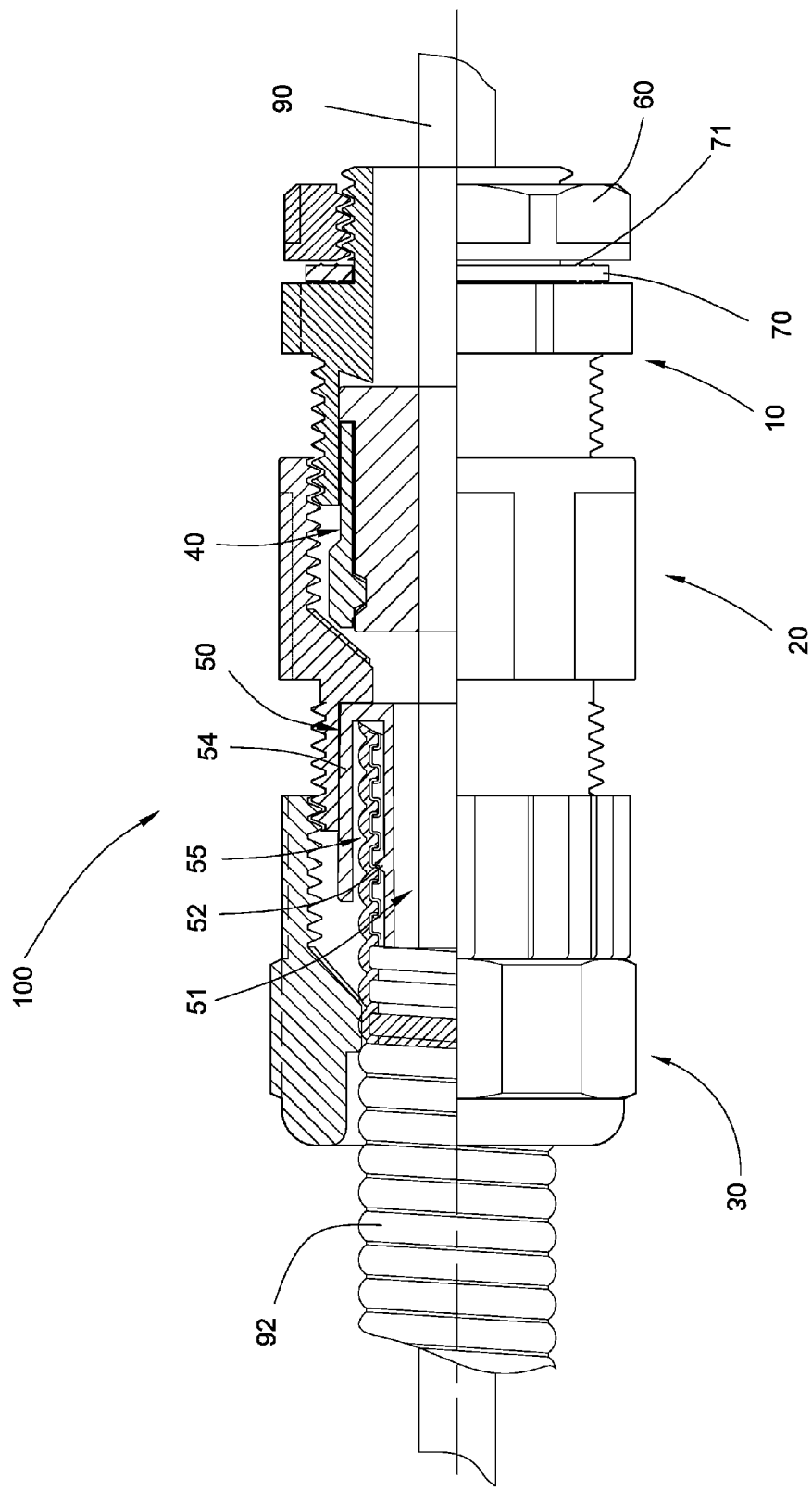
FIG. 9 is a schematic sectional view of still another alternate form of the present invention, illustrating the use of a different design of auxiliary clamping sleeve.

Referring to FIG. 9, still another alternate form of the present invention is shown for locking a flexible conduit 92 and a cable 90 to, for example, a junction box. According to this embodiment, the cable and flexible conduit gland assembly 100 comprises a mounting member 10 having a first outer thread 11, at least one connection member 20 each comprising a second outer thread 21, a first axial hole 22, a first tapered surface 23 and a first inner thread 24 that is threaded onto the first outer thread 11, an outer cap 30 comprising a second tapered surface 32 and a second inner thread 33 that is threaded onto the second outer thread 21, a packing device 40 that comprises a packing sleeve 41 mounted in the mounting member 10 and the first axial hole 22 of the connection member 20 and defining therein a through hole 411 and a clamping member 42 sleeved onto the packing sleeve 41, and an auxiliary clamping sleeve 50 that is mounted in the axial through hole 31 of the outer cap 30 and the second axial hole 25 of the connection member 20, comprising a through hole 51 axially extended through two opposite ends thereof, an outer race 54 spaced around the periphery thereof, an annular mounting groove 55 defined within the outer race 54 for receiving the peripheral conduit wall of the flexible conduit 92 that is a metal conduit (coiled conduit), and an annular hooked portion 52 defined in the annular mounting groove 55 for engaging the inside wall of the flexible conduit 92.

In conclusion, the invention provides a cable and flexible conduit gland assembly, which has the functions and advantages as follows:

1. The rating 100%-IP68 makes the cable and flexible conduit gland assembly practical for underwater application.

2. The cable and flexible conduit gland assembly provides enhanced protection against typhoon and hurricane.

3. The cable and flexible conduit gland assembly provides dynamic waterproof effects.

4. The cable and flexible conduit gland assembly breaks the general waterproof and anti-tensile limits.

5. The cable and flexible conduit gland assembly meets UL standard safety requirements that electrical cable clamps and plugs cannot be shaken over 0.6 mm.

6. The well watertight effect of the cable and flexible conduit gland assembly is practical for use in a deep-water environment or high explosive atmosphere to protect against gas and water.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A cable and flexible conduit gland assembly comprising:
   a mounting member;
   a first connection member;
   a second connection member;
   an outer cap;
   a first packing device;
   a second packing device;
   an auxiliary clamping sleeve;
   a locking member;
   a gasket ring;
   the mounting member comprising a first outer thread, a third outer thread, a stop flange, an outer locating groove, a first mounting hole and a third mounting hole;
   the stop flange being formed in between the first outer thread and the outer locating groove;
   the outer locating groove being formed in between the stop flange and the third outer thread;
   the first outer thread surrounding the first mounting hole;
   the third outer thread surrounding the third mounting hole;
   the first mounting hole and the third mounting hole being located opposite to and communicated with each other;
   the first and second connection members being identical to and exchangeable with each other;
   each of the first and second connection members comprising a first inner thread, a second outer thread, a first axial hole, a second axial hole and a first tapered surface;
   the first inner thread surrounding the first axial hole;
   the second outer thread surrounding the second axial hole;
   the first axial hole and the second axial hole being located opposite to and communicated with each other;
   the first tapered surface being defined in the first axial hole;
   the first inner thread being defined in the first axial hole;
   the first inner thread being located adjacent to the first tapered surface;
   the first inner thread of the first connection member being threaded onto the second outer thread of the second connection member;
   the first inner thread of the second connection member being threaded onto the first outer thread;
   the outer cap comprising an axial through hole, a second inner thread and a second tapered surface;
   the axial through hole extending through two opposite ends of the outer cap;
   the second tapered surface being defined in the axial through hole;
   the second inner thread being defined in the axial through hole;
   the second inner thread being located adjacent to the second tapered surface;
   the second inner thread being threaded onto the second outer thread of the first connection member;
   the first and second packing devices being identical to and exchangeable with each other;
   each of the first and second packing devices comprising a packing sleeve and a clamping member;
   the packing sleeve comprising an axially extended through hole;
   the axially extended through hole being defined in the packing sleeve;
   the clamping member being sleeved onto the packing sleeve;
   the packing sleeve and the clamping member of the first packing device being mounted in between and inserted into the first axial hole of the first connection member and the second axial hole of the second connection member;
   the packing sleeve and the clamping member of the second packing device being mounted in between and inserted into the first axial hole of the second connection member and the first mounting hole;
   the auxiliary clamping sleeve being mounted in between and inserted into the axial through hole of the outer cap and the second axial hole of the first connection member;
   the auxiliary clamping sleeve comprising an auxiliary through hole and an annular hooked portion;
   the auxiliary through hole axially extending through two opposite ends of the auxiliary clamping sleeve;
   the annular hooked portion being defined in the auxiliary through hole;
   the locking member comprising an inner locking thread;
   the inner locking thread being threaded onto the third outer thread;
   the gasket ring being sleeved onto the mounting member and located in between the stop flange and the third outer thread;
   the gasket ring being mounted in the locating groove;
   the gasket ring comprising a first annular sealing flange and a second annular sealing flange;
   the first and second annular sealing flanges being formed on two opposite sides of the gasket ring;
   the first annular sealing flange being configured to selectively contact against the stop flange and a board member;
   the stop flange being configured to contact against the board member;
   the third outer thread being configured to penetrate the board member;
   the first annular sealing flange and the stop flange respectively contacting against two opposite sides of the board member in response to the third outer thread penetrating the board member; and
   the second annular sealing flange contacting against the locking member without contacting against the board member.

* * * * *